United States Patent
Keeler

[19]

[11] Patent Number: 6,015,254
[45] Date of Patent: *Jan. 18, 2000

[54] SNOWMOBILE LIFT CART, AND METHODS OF CONSTRUCTING AND UTILIZING SAME

[76] Inventor: Michael E. Keeler, 10063 W. Jackson Rd., Riverdale, Mich. 48877-9725

[ * ] Notice: Under 35 U.S.C. 154(b), the term of this patent shall be extended for 151 days.

[21] Appl. No.: 08/575,125

[22] Filed: Dec. 19, 1995

[51] Int. Cl.$^7$ ........................................................ B62B 1/00
[52] U.S. Cl. ........................ 414/447; 254/131; 280/47.2; 280/79.7; 414/449; 414/490
[58] Field of Search .................... 414/444, 447, 414/449, 490; 280/79.7, 47.2, 47.23, 47.27, 47.29; 254/131

[56] References Cited

U.S. PATENT DOCUMENTS

| | | | |
|---|---|---|---|
| 375,911 | 1/1888 | Aber | 414/447 |
| 831,780 | 9/1906 | Ferriss, Jr. | 254/131 |
| 2,594,540 | 4/1952 | Cole et al. | 414/447 |
| 3,075,662 | 1/1963 | Prato et al. | 414/449 |
| 3,105,698 | 10/1963 | Bonarrigo et al. | 280/47.131 |
| 3,149,738 | 9/1964 | Bombardier | 414/469 |
| 3,612,563 | 10/1971 | Kazmark, Sr. | 280/655 |
| 3,658,200 | 4/1972 | Chaplinski | 414/447 |
| 3,667,728 | 6/1972 | Garelick | 254/131 X |
| 3,860,078 | 1/1975 | Stoick | 180/183 |
| 3,897,959 | 8/1975 | Haffner | 280/79.11 |
| 4,288,087 | 9/1981 | Morrison | 280/47.32 |
| 4,471,971 | 9/1984 | Keesler | 280/79.11 |
| 4,572,531 | 2/1986 | Elia | 280/62 |
| 4,762,193 | 8/1988 | Levine | 280/47.2 X |
| 4,978,103 | 12/1990 | Moisan | 254/131 |
| 5,299,659 | 4/1994 | Imbeault et al. | 280/79.7 X |
| 5,433,460 | 7/1995 | Young | 280/79.7 X |
| 5,513,939 | 5/1996 | Martin et al. | 414/490 X |

FOREIGN PATENT DOCUMENTS

| | | | |
|---|---|---|---|
| 251333 | 11/1987 | Germany | 414/490 |
| 1710419 | 2/1992 | Russian Federation | 280/47.23 |
| 125069 | 3/1919 | United Kingdom | 280/47.2 |

*Primary Examiner*—David A. Bucci
*Attorney, Agent, or Firm*—Carrier, Blackman & Associates, P.C.; William D. Blackman; Joseph P. Carrier

[57] ABSTRACT

A snowmobile dolly comprising a first elongated member; a plurality of wheels disposed along the first elongated member; a second elongated member; a mount for securing the second elongated member relative to the first elongated member so that a longitudinal axis of the first elongated member and the second elongated member are substantially parallel to each other, the second elongated member being sized so as to support a front end of the snowmobile; a third elongated member having a first end portion which is attached to an end of the first elongated member; and a hook for securing a back end of the snowmobile to the third elongated member so as to substantially balance the snowmobile on the second elongated member.

24 Claims, 2 Drawing Sheets

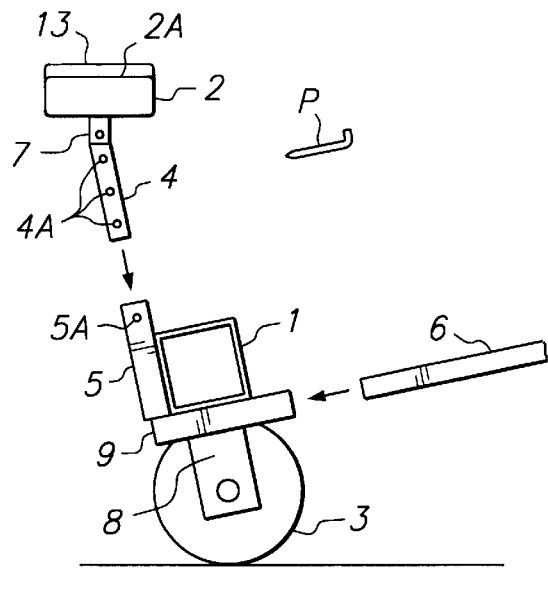
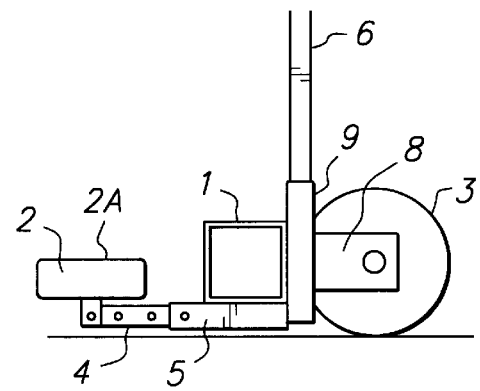
FIG. 3
FIG. 4
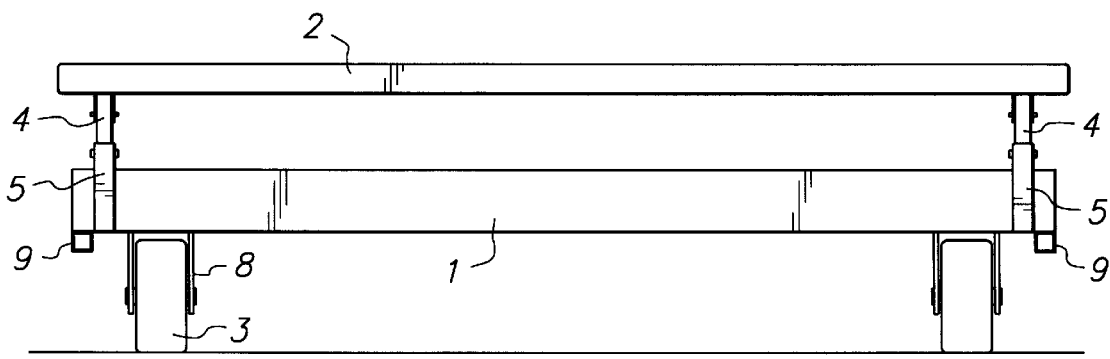
FIG. 5

SNOWMOBILE LIFT CART, AND METHODS OF CONSTRUCTING AND UTILIZING SAME

BACKGROUND OF THE INVENTION

1. Field of Invention

The invention pertains to a device for lifting objects, and in particular to a device for manually lifting and transporting a snowmobile or other vehicle.

It is often necessary to lift and transport a recreational vehicle manually, such as when taking the vehicle to and from storage locations.

2. Description of the Relevant Art

There are known devices for lifting and/or transporting articles. For example, Bonarrigo U.S. Pat. No. 3,105,698 discloses a two-wheeled dolly for manually transporting a table.

Keesler U.S. Pat. No. 4,471,971 discloses a dolly for transporting display islands commonly found in retail stores.

Elia U.S. Pat. No. 4,572,531 discloses a dolly for transporting and/or storing a snow plow blade.

Stoick U.S. Pat. No. 3,860,078 discloses a two component dolly for storing and/or transporting a snowmobile.

Kazmark U.S. Pat. No. 3,612,563 discloses a two-wheeled carrier for transporting luggage.

Haffner U.S. Pat. No. 3,897,959 discloses a snowmobile dolly.

Morrison U.S. Pat. No. 4,288,087 discloses a snowmobile support dolly.

U.S. Pat. No. 3,881,740 discloses a snowmobile support dolly.

Bombardier U.S. Pat. No. 3,149,738 discloses a trailer for towing a snowmobile.

The above-discussed references, however, fail to disclose or otherwise suggest a portable device for lifting an object, such as a snowmobile, from the ground and for transporting the lifted object manually.

SUMMARY OF THE INVENTION

The present invention overcomes the above-discussed shortcomings and satisfies a significant need for a device for easily lifting and transporting objects, such as snowmobiles or other recreational vehicles.

According to the present invention, there is provided a combination cart and lifting device for snowmobiles or other objects, comprising a first elongated member; a plurality of wheels disposed along a longitudinal side of the first elongated member; a second elongated member; means for adjustably positioning the second elongated member relative to the first elongated member so that the longitudinal axis of the second elongated member is in parallel alignment with the first elongated member, for lifting a first end portion of the object; a third elongated member having a first end portion which is removably attached to an end of the first elongated member; and a means for hooking a second end of the object with a second end of the third elongated member so as to lift and balance the object on the second elongated member upon manipulation of the second end of the third elongated member. In the preferred embodiments of the present invention, the distance between the first elongated member and the second elongated member is adjustable so as to accommodate objects having different ground clearances.

In use, the second elongated member is adjusted to the desired distance from the first elongated member. Then the third elongated member is attached to an end of the first elongated member. Next, the first and second elongated members are slid underneath the object just forwardly of the object's center of gravity so that they extend substantially laterally across the object, with the third elongated member extending substantially upwardly. In this position, the first and second elongated members lie substantially against the ground surface. By rotating the third elongated member substantially downwardly towards the back end of the object, the second elongated member is substantially raised from the ground surface and positioned above the first elongated member and the wheels, thereby resulting in the forward end of the object being lifted from the ground on top of the second elongated member. The back end of the device is then hooked onto the second or free end of the third elongated member, so that maintaining the second end of the third elongated member above the hooked portion of the object's back end elevates the back end of the object off the ground, thereby resulting in the snowmobile being balanced on the second elongated member. With the wheels being in contact with the ground surface, the object may be thereafter manually transported by either pulling or pushing the second end of the third elongated member. Steering is accomplished by moving the second end of the third elongated member from side to side.

Further, the hooking means is preferably but not necessarily adjustable along the third elongated member so as to accommodate objects of different lengths.

It is an object of the present invention to provide a device which is used to easily lift and transport large articles.

Another object of the present invention is to provide a device which is used to manually lift and transport snowmobiles or other vehicles.

Still another object of the present invention is to provide a device for lifting and transporting large articles having different lengths and ground clearances.

Another object of the present invention is to provide a portable dolly for a snowmobile which is substantially collapsible when not in use.

It is another object of the present invention to provide a device for easily manually maneuvering a snowmobile.

A further object of the present invention is to provide a device for storing a snowmobile with the track portion in an elevated position.

Other objects, advantages and salient features of the present invention will become apparent from the following detailed description, which, when taken in conjunction with the annexed drawings, disclose preferred embodiments of the present invention.

BRIEF DESCRIPTION OF THE PREFERRED EMBODIMENTS

FIG. 3 is a side elevational view of a front portion of a preferred embodiment of the present invention in an upright position.

FIG. 4 is a side elevational view of a front portion of a preferred embodiment of the present invention in a lowered position.

FIG. 5 is a front elevational view of a preferred embodiment of the present invention.

DETAILED DESCRIPTION OF THE INVENTION

Figure 1:
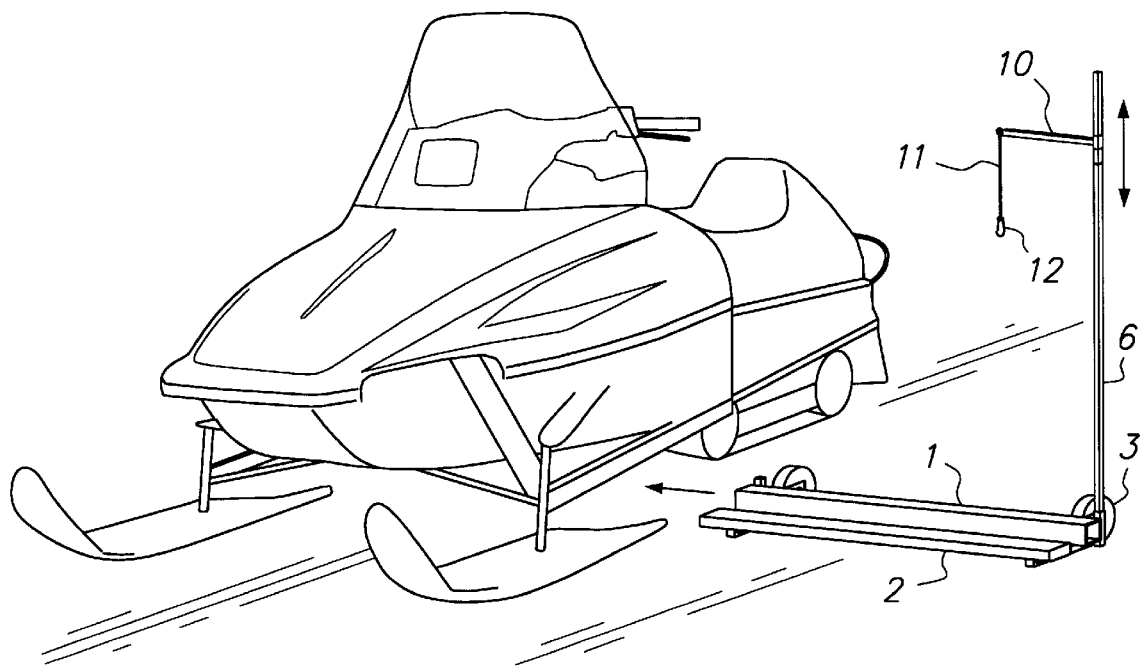
FIG. 1 is a perspective view of a preferred embodiment of the present invention in association with a snowmobile.

Referring to FIGS. 1–5, there is shown a device for lifting and transporting an object, such as a snowmobile or other recreational vehicle, comprising first elongated member 1, second elongated member 2, third elongated member 6, wheel members 3, and support brackets 4 and 5. The device is preferably, but not necessarily, constructed from a high strength, rigid material being substantially resistant to fatigue, such as metal alloys. Alternatively, the device is constructed from other rigid materials.

As shown in FIGS. 3–5, first elongated member 1 preferably, but not necessarily, comprises an elongated piece of tubing. In one preferred embodiment, first elongated member 1 has a square or rectangular cross-section (FIGS. 3 and 4). In a second preferred embodiment, first elongated member 1 has a substantially circular cross-section. The length of first elongated member 1 is preferably, but not necessarily, sized so as to substantially stably support a front portion of a snowmobile thereover.

The preferred embodiments of the present invention preferably, but not necessarily, include a plurality of wheel members 3. As shown in FIG. 5, each wheel member 3 is attached to an end portion of first elongated member 1 by wheel frame 8 so that its axis of rotation is substantially parallel to the longitudinal axis of first elongated member 1. In a preferred embodiment of the present invention, each wheel frame 8 maintains the rotational axis of wheel member 3 in a fixed position relative to first elongated member 1.

In one preferred embodiment of the present invention, wheel members 3 are constructed from a hardened plastic. Alternatively, wheel members 3 are constructed from a slightly resilient material, such as a rubber composition.

Second elongated member 2 is preferably mounted relative to first elongated member 1 at a distance therefrom so that the longitudinal axis of first elongated member 1 is substantially in parallel alignment with the longitudinal axis of second elongated member 2, as shown in FIG. 5. The length of second elongated member 2 is preferably, but not necessarily, substantially comparable to the length of first elongated member 1.

In the preferred embodiments of the present invention, a front portion of a snowmobile or other object is adapted to rest on top of second elongated member 2. As a result, second elongated member 2 is preferably constructed from a solid material having cross-sectional dimensions so as to support the object along its central portion. In one preferred embodiment, second elongated member 2 is constructed from a 2×4, but alternatively it is of a tubular construction.

Because a front portion of a snowmobile or other object is adapted to rest on top of second elongated member 2, the top surface 2A of second elongated member 2 preferably, but not necessarily, has a substantially slip-resistant cover or coating 13 which substantially prevents the object from being scratched from contact with second elongated member 2. In one preferred embodiment of the present invention, cover 13 comprises carpeting which is glued or otherwise attached to second elongated member 2. In a second preferred embodiment of the present invention, cover 13 comprises a sheet of a resilient material, such as a resilient plastic or rubber composition, which is glued or otherwise attached along top surface 2A of second elongated member 2 (FIG. 3).

The present invention preferably, but not necessarily, includes a means for adjustably positioning second elongated member 2 at a distance from first elongated member 1 so the device can effectively lift objects having a wide variety of ground clearances. The positioning means preferably comprises a pair of adjustable brackets connected at either end of elongated members 1 and 2, with each adjustable bracket including male bracket member 4 which is connected to the bottom surface of second elongated member 2, and female bracket member 5 which is connected to first elongated member 1 so as to extend upwardly therefrom (FIG. 3). Bracket member 4 preferably, but not necessarily, includes a plurality of apertures 4A defined laterally therethrough, and bracket member 5 preferably includes an aperture 5A defined laterally therethrough. In this way, the spacing between first elongated member 1 and second elongated member 2 is adjusted to the desired amount by telescopically sliding male bracket members 4 into female bracket members 5 so that one set of apertures 4A is aligned with apertures 5A of female bracket members 5, and by placing pin P through the aligned apertures.

Elongated members 1 and 2 are intended to be selectively freely positioned underneath the front end portion of a snowmobile or other object approximately just forwardly of the snowmobile's center of gravity, by resting elongated members 1 and 2 substantially against the ground surface (as shown in FIG. 4) and sliding them laterally underneath the snowmobile (FIG. 1). Thereafter, the forward end of the snowmobile is lifted by pivoting elongated members 1 and 2 about wheels 3 so that elongated member 2 is moved into a substantially upright position (FIG. 3) and contacts the bottom surface of the snowmobile. In order to substantially prevent scratches or other markings from occurring on the underside of the snowmobile due to contact with elongated member 2 when this pivoting motion is undertaken, the present invention preferably includes means for rotating elongated member 2 relative to elongated member 1 so that top surface 2A thereof substantially engages with the snowmobile underside throughout the entire pivoting motion. The rotating means preferably, but not necessarily, comprises male bracket member 4 having a hinge component 7 so that elongated member 2 is capable of rotating thereabout.

Hinge component 7 preferably, but not necessarily, includes a means for adjusting the ease of rotation of elongated member 2 relative to bracket member 4. In one preferred embodiment of the present invention, the adjusting means comprises a lock nut.

The present invention preferably, but not necessarily, includes a plurality of tubing members 9, each of which is attached to an end of elongated member 1 so that tubing member 9 extends laterally along a side thereof, as shown in FIGS. 3, 4 and 5. Tubing members 9 are sized and shaped so as to securely receive an end portion of third elongated member 6.

Third elongated member 6 preferably, but not necessarily, removably engages with tubing members 9. In this way, third elongated member 6 acts as a lever in pivoting elongated members 1 and 2 between a first position wherein elongated members 1 and 2 are substantially contacting the ground (FIG. 4), and a second position wherein elongated members 1 and 2 are in a substantially elevated, upright position relative to wheels 3 (FIG. 3).

In the preferred embodiments of the present invention, the forward end of a snowmobile or other object is lifted as elongated members 1 and 2 are pivoted into the upright position (FIG. 3). The present invention preferably, but not necessarily, includes a means for raising a rearward end of the snowmobile or other object as the forward end thereof is lifted. The raising means preferably but not necessarily comprises a fourth elongated member 10 which slidably engages with third elongated member 6 so as to extend outwardly therefrom; line 11, one end of which extends from the outwardly extended end of fourth elongated member 10; and hook member 12, which is suspended from the free end of line 11 and is adapted to engage with the outwardly extended end of fourth elongated member 10. In this way, the rearward end of the snowmobile is raised or suspended from the ground by wrapping line 11 around the snowmobile bumper and attaching hook member 12 to the end of elongated member 10. Then by maintaining the end portion of elongated member 6 above the height of the snowmobile bumper, the rearward end of the snowmobile is lifted from the ground (FIG. 2) so that the snowmobile is substantially balanced on elongated member 2.

In the preferred embodiments of the present invention, elongated member 10 is constructed from tubing having a length which is approximately comparable to half of the width of a snowmobile.

Elongated member 10 preferably, but not necessarily, includes a means for removably locking elongated member 10 at substantially any location along elongated member 6. As a result, the device is usable for lifting and transporting snowmobiles or other objects having a wide variety of lengths.

The present invention is preferably, but not necessarily, collapsible so that it can be efficiently stored or carried when not in use. Elongated member 6 may be disconnected from tubing member 9, and thereafter inserted within elongated member 1.

In use, the device is assembled by inserting one end of elongated member 6 into one of tubing members 9, and adjusting the space between elongated members 1 and 2 based upon the amount of ground clearance of the snowmobile or other object. Elongated members 1 and 2 are then positioned substantially against a ground surface (FIG. 4) and slid underneath the front end of a snowmobile or other object just forwardly of its center of gravity, so that elongated member 6 is extended upwardly from the ground (FIG. 1). In this position, elongated member 2 is pivoted about hinge member 7 so as to extend substantially upwardly (FIG. 4).

Figure 2:
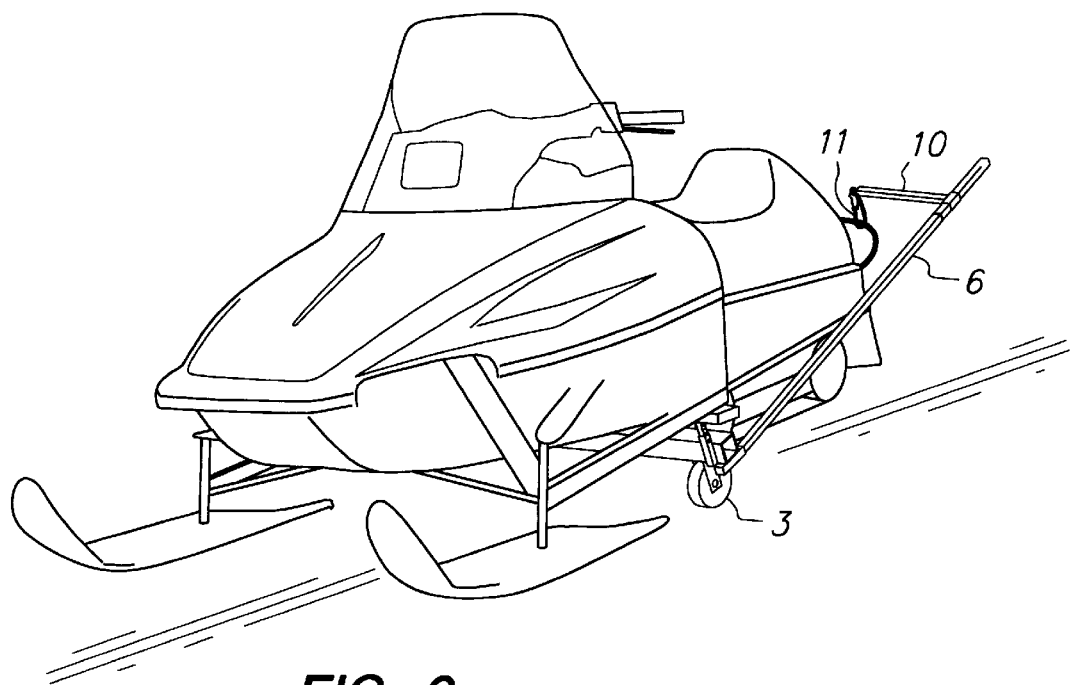
FIG. 2 is a perspective view of a preferred embodiment of the present invention being engaged with a snowmobile.

Next, elongated members 1 and 2 are moved into an upright position by grasping the free end of elongated member 6 and rotating it downwardly towards the rear end of the snowmobile or other object. As the free end of elongated member 6 is rotated, elongated member 2 eventually contacts the underside of the snowmobile or other object and thereafter raises the forward end of the snowmobile above the ground as elongated member 6 is rotated further. When the free end of elongated member 6 is at an approximate height 9 the rear end of the snowmobile or other object, elongated member 10 is adjusted along elongated member 6 so as to extend just beyond the snowmobile. Then line 11 is wrapped around the snowmobile bumper and hook 12 is attached to the end of elongated member 10. Thereafter, by rotating elongated member 6 upwardly, the rearward end of the snowmobile or other object is raised from the ground so that the snowmobile is balanced in an elevated position on elongated member 2, as shown in FIG. 2.

After the forward and rearward ends of the object have been lifted, the object is transported by pulling or pushing elongated member 6. When pushing elongated member 6 in order to move the object, steering the object is performed by maneuvering the free end of elongated member 6 in a direction which is substantially opposite to the direction the object is desired to travel.

Further, the lifted snowmobile may be stored in this lifted position for a prolonged period of time by maintaining the free end of elongated member 6 in a raised position. By storing the snowmobile so that the track portion thereof is in an elevated position, the track portion thereof will not prematurely wear from prolonged, stationary contact with the ground.

Although there have been described what are at present considered to be the preferred embodiments of the present invention, it will be understood that the invention can be embodied in other specific forms without departing from the spirit or essential characteristics thereof.

The described embodiments are, therefore, to be considered in all aspects as illustrative, and not restrictive. The scope of the invention is indicated by the appended claims rather than the foregoing description.

I claim:

1. A device for lifting and transporting a snowmobile, comprising:

a first elongated member;

a plurality of wheels disposed along a longitudinal side of said first elongated member;

a second elongated member;

means for mounting said second elongated member relative to said first elongated member so that a longitudinal axis of said first elongated member and said second elongated member are substantially parallel to each other, said second elongated member being sized so as to substantially support a first end of the snowmobile thereon;

a third elongated member having a first end portion which is attached to an end of said first elongated member;

said first elongated member, said second elongated member, said wheels and said mounting means are sized and dimensioned for sliding underneath a snowmobile while operably engaged with each other and while said first elongated member is attached to said third elongated member, for placing said device in a position to lift the snowmobile; and a means for engaging a second end of the snowmobile with a second end portion of said third elongated member so as to balance the snowmobile on said second elongated member.

2. A lifting device as recited in claim 1, wherein:

said engaging means is adjustably engaged along said second end portion of said third elongated member.

3. A lifting device as recited in claim 1, wherein:

said second elongated member is pivotally mounted relative to said first elongated member so as to substantially rotate about a longitudinal axis of said second elongated member.

4. A lifting device as recited in claim 1, wherein:

said second elongated member is mounted relative to said first elongated member so that a distance therebetween is adjustable.

5. A lifting device as recited in claim 1, wherein:

said third elongated member is removably connected to said first elongated member.

6. A lifting device as recited in claim 5, wherein:

said first elongated member is substantially tubular; and said third elongated member is selectively telescopically received by said first elongated member when said device is not in use.

7. A lifting device as recited in claim 2, wherein:

said engaging means comprises a fourth elongated member having a first end which is selectively engaged along said second end of said third elongated member, and a line member which suspends from a second end of said fourth elongated member.

8. A lifting device as recited in claim 3, wherein:

said second elongated member is mounted relative to said first elongated member by said mounting means so that a distance therebetween is adjustable.

9. A lifting device as recited in claim 8, wherein:

said mounting means comprises a plurality of bracket members, each of said bracket members comprising a first tubular member which is attached to an end portion of said first elongated member, and a second tubular member having a first end which is pivotally attached to said second elongated member and a second end which is adjustably telescopically received by said first tubular member.

10. A snowmobile dolly, comprising:

a first elongated member;

a second elongated member removably attached to said first elongated member;

a plurality of wheels connected to said first elongated member;

lever means for rotating said first and said second elongated members between a first position wherein said first and second elongated members are positioned substantially against a ground surface beneath a front portion of the snowmobile, and a second position wherein said first and said second elongated members are positioned above said wheels so that a front portion of the snowmobile rests on a top surface of said second elongated member; and said first elongated member, said second elongated member and said wheels are sized and dimensioned for sliding underneath a snowmobile while operably engaged with each other and while suitably connected to said lever means, for placing said device in a position to lift the snowmobile; and means, operably associated with said lever means, for maintaining a rear portion of the snowmobile above the ground so that the snowmobile is substantially balanced on said second elongated member.

11. A dolly as recited in claim 10, wherein:

said lever means comprises a third elongated member having a first end which is removably engaged with said first elongated member.

12. A dolly as recited in claim 11, wherein:

said maintaining means includes an attachment member which selectively engages the rear portion of the snowmobile with a second end of said third elongated member; and said attachment member is adjustable connected along said third elongated member.

13. A dolly as recited in claim 11, wherein:

said maintaining means comprises a fourth elongated member which extends outwardly from a second end portion of said third elongated member, and a attachment member which is suspended from said fourth elongated member and selectively engages the rear portion of the snowmobile with said fourth elongated member.

14. A dolly as recited in claim 13, wherein:

said fourth elongated member is slidably engaged with said third elongated member so as to lock into position at a plurality of locations therealong.

15. A dolly as recited in claim 10, further including:

means for mounting said second elongated member relative to said first elongated member so that a longitudinal axis of said first elongated member is in substantially parallel alignment with a longitudinal axis of said first elongated member at a distance therefrom.

16. A dolly as recited in claim 15, wherein:

said mounting means includes means for adjusting a distance between said first elongated member and said second elongated member.

17. A dolly as recited in claim 16, wherein:

said adjusting means comprises at least one male bracket member which is attached to one of said first elongated member and said second elongated member, at least one female bracket member which is attached to the other of said first elongated member and said second elongated member, and wherein said at least one male bracket member is adjustably telescopically positioned within said at least one female bracket member.

18. A dolly as recited in claim 15, wherein:

said mounting means includes a means for pivoting said second elongated member about a longitudinal axis.

19. A dolly for transporting an object, comprising:

a first elongated member;

a plurality of wheels, each of which is attached to said first elongated member;

a lever member having a first end which is attached to said first elongated member so as to extend outwardly therefrom, for moving said first elongated member and said wheels between a first position wherein said first elongated member is positioned substantially against a ground surface, and a second position wherein said first elongated member is positioned substantially above said wheels so as to lift a front portion of the object above the ground surface;

means, connected to said lever member, for attaching a back portion of the object to a second end of the lever so that the object is substantially balanced on said first elongated member as said second end of said lever member is maintained in an elevated position relative to the ground surface;

said first elongated member and said wheels are sized and dimensioned for sliding underneath the object while operably engaged with each other and while suitably connected to said lever member, for placing said device in a position to lift the object; and said attaching means is adjustably connected along said lever member.

20. A dolly as recited in claim 19, further including:

a second elongated member which is connected to said first elongated member so that in said first position said second elongated member is positioned substantially against the ground surface and in said second position said second elongated member is positioned substantially above said first elongated member so as to contact an underside of the front portion of the object;

said second elongated member is pivotally connected to said first elongated member and is sized and dimensioned for sliding underneath the object while operably engaged with said first elongated member and while said first elongated member is engaged with said lever member, for placing said device in a position to lift the object.

21. A device for lifting and transporting a snowmobile, comprising:

an elongated support member for substantially horizontal placement below a snowmobile and supportively contacting an underside of said snowmobile, said support member having opposed first and second ends;

a spacer member removably connectable to said support member for selectively spacing said support member upwardly away from a substrate when said device is in a working position thereof;

lever means operably connectable to said support member for rotating said support member between a resting position and a working postition where said support member is in a raised position;

wherein said device is substantially L-shaped when said lever means is operably connected to said support member, to allow slidable lateral insertion of a free end of said support member beneath said snowmobile, from a position at a side thereof.

22. A device according to claim 21, including:

one or more wheel members connected to said first member.

23. A device according to claim 21, wherein:

said lever means includes an elongated third member having a first end which is removably engageable with said first member.

24. A device according to claim 23, further comprising means operatively connected to said lever means for maintaining a portion of said snowmobile above the ground so that said snowmobile is substantially balanced on said device to facilitate transport thereof;

wherein said maintaining means includes a moveable member which selectively engages a predetermined portion of said snowmobile.

* * * * *

UNITED STATES PATENT AND TRADEMARK OFFICE
CERTIFICATE OF CORRECTION

PATENT NO. : 6,015,254
DATED : 18 January 2000
INVENTOR(S) : Michael E. Keeler

It is certified that error appears in the above-identified patent and that said Letters Patent is hereby corrected as shown below:

Column 1, 3rd line, change "OF THE" (where "0" is the number zero) to --OF THE-- (where "O" is the letter "O").

Column 4, line 64, after "preferably" insert a comma; after "necessarily" insert a comma.

Column 5, line 49, change "height 9" to --height of--.

Column 7, line 38 (claim 10, 20th line), change "device" to --dolly--;
  line numbered between 53 and 54 (claim 12, 6th line), change "adjustable" to --adjustably--;
  line 59 (claim 13, 4th line), change "a attach-" to --an attach- --.

Column 8, line 4 (claim 8, 4th line), change "first" to --second--.

Column 9, line 11 (claim 21, 13th line), change "postition" to --position--.

Column 10, line 2 (claim 22, 2nd line), change "first" to --support--;
  line 5 (claim 23, 2nd line), delete "third".

Signed and Sealed this

Twenty-first Day of November, 2000

Attest:

Attesting Officer

Q. TODD DICKINSON

Director of Patents and Trademarks